US009993805B2

United States Patent
Ogawa et al.

(10) Patent No.: US 9,993,805 B2
(45) Date of Patent: Jun. 12, 2018

(54) CATALYST COMPOSITION FOR PURIFYING EXHAUST GAS AND EXHAUST GAS PURIFYING CATALYST

(71) Applicant: Mitsui Mining & Smelting Co., Ltd., Tokyo (JP)

(72) Inventors: Makoto Ogawa, Saitama (JP); Yuki Nagao, Saitama (JP); Yunosuke Nakahara, Saitama (JP)

(73) Assignee: MITSUI MINING & SMELTING CO., LTD., Tokyo (JP)

( * ) Notice: Subject to any disclaimer, the term of this patent is extended or adjusted under 35 U.S.C. 154(b) by 0 days. days.

(21) Appl. No.: 15/303,367

(22) PCT Filed: Jan. 29, 2015

(86) PCT No.: PCT/JP2015/052461
§ 371 (c)(1),
(2) Date: Oct. 11, 2016

(87) PCT Pub. No.: WO2015/159568
PCT Pub. Date: Oct. 22, 2015

(65) Prior Publication Data
US 2017/0028387 A1  Feb. 2, 2017

(30) Foreign Application Priority Data

Apr. 17, 2014 (WO) ................ PCT/JP2014/060913

(51) Int. Cl.
*B01J 23/889* (2006.01)
*B01J 23/72* (2006.01)
(Continued)

(52) U.S. Cl.
CPC .......... *B01J 23/8892* (2013.01); *B01D 53/94* (2013.01); *B01D 53/945* (2013.01); *B01J 23/72* (2013.01);
(Continued)

(58) Field of Classification Search
CPC ...... B01J 23/8892; B01J 23/72; B01J 23/745; B01J 23/75; B01J 23/755; B01J 23/889;
(Continued)

(56) References Cited

U.S. PATENT DOCUMENTS 3,216,954 A * 11/1965 Howk .................... B01D 53/86
423/213.5
3,316,057 A *  4/1967 Howk et al. ........... B01D 53/86
423/213.2
(Continued)

FOREIGN PATENT DOCUMENTS

EP        2441510 A1    4/2012
JP        09075733      3/1997
(Continued)

OTHER PUBLICATIONS

International Search Report dated Feb. 24, 2015 filed in PCT/JP2015/052461.

*Primary Examiner* — Patricia L. Hailey
(74) *Attorney, Agent, or Firm* — Rankin, Hill & Clark LLP

(57) ABSTRACT

The present invention relates to a catalyst composition for purifying exhaust gas and an exhaust gas purifying catalyst which contain a manganese-containing composite oxide, and an object of the invention is to provide a novel catalyst composition which can sufficiently function as an exhaust gas purifying catalyst even without supporting a precious metal as a catalytically active component. To achieve the object, there is proposed a catalyst composition for purifying exhaust gas including particles containing a manganese-containing composite oxide and particles containing a metal of Group 5 to Group 11 having an electron in the d orbital (however, Mn, Pt, Rh, and Pd are excluded) or an oxide of the metal in a mixed state.

9 Claims, 2 Drawing Sheets

(51) Int. Cl.
  *B01J 23/745* (2006.01)
  *B01J 23/75* (2006.01)
  *B01D 53/94* (2006.01)
  *B01J 23/755* (2006.01)

(52) U.S. Cl.
  CPC ............. *B01J 23/745* (2013.01); *B01J 23/75* (2013.01); *B01J 23/755* (2013.01); *B01J 23/889* (2013.01); *B01D 2255/104* (2013.01); *B01D 2255/2061* (2013.01); *B01D 2255/2073* (2013.01); *B01D 2255/20738* (2013.01); *B01D 2255/20746* (2013.01); *B01D 2255/20753* (2013.01); *B01D 2255/20761* (2013.01); *B01D 2255/40* (2013.01)

(58) Field of Classification Search
  CPC .............................. B01D 53/94; B01D 53/945; B01D 2255/104; B01D 2255/2061; B01D 2255/2073; B01D 2255/20738; B01D 2255/20746; B01D 2255/20753; B01D 2255/20761; B01D 2255/40; B01D 2255/65
  USPC ....... 502/324, 302, 325, 330, 331, 344, 345, 502/347; 423/213.2, 239.1
  See application file for complete search history.

(56) References Cited

U.S. PATENT DOCUMENTS

| | | | | |
|---|---|---|---|---|
| 5,182,249 | A * | 1/1993 | Wang | B01D 53/945 423/213.2 |
| 5,879,645 | A * | 3/1999 | Park | B01D 53/9418 423/213.2 |
| 6,551,564 | B1 | 4/2003 | Mabilon | |
| 7,666,376 | B2 * | 2/2010 | Dornseiffer | B01D 53/944 423/210 |
| 7,691,777 | B2 * | 4/2010 | Isogai | B01D 53/945 423/263 |
| 8,057,767 | B1 * | 11/2011 | Qi | B01D 53/944 423/213.2 |
| 8,765,092 | B2 * | 7/2014 | Qi | B01J 23/34 423/213.2 |
| 9,246,163 | B2 * | 1/2016 | Tanaami | C01F 17/0043 |
| 2007/0191218 | A1 | 8/2007 | Isogai | |
| 2014/0336045 | A1 * | 11/2014 | Nazarpoor | B01D 53/944 502/303 |
| 2015/0144487 | A1 * | 5/2015 | Miwa | G01N 27/4075 204/424 |
| 2016/0023188 | A1 * | 1/2016 | Nazarpoor | B01J 23/002 502/302 |
| 2016/0303549 | A1 * | 10/2016 | Masuda | B01J 23/86 |

FOREIGN PATENT DOCUMENTS

| | | | |
|---|---|---|---|
| JP | 2001198440 A2 | 7/2001 | |
| JP | 200626554 | 2/2006 | |
| JP | 2007105633 A2 | 4/2007 | |
| JP | 2007216099 A2 | 8/2007 | |
| JP | 2008100184 A2 | 5/2008 | |
| JP | 2009279579 A2 | 12/2009 | |
| JP | 2010284583 A2 | 12/2010 | |
| JP | 2010284584 A2 | 12/2010 | |
| JP | 2013163178 A2 | 8/2013 | |
| JP | 2013233541 A2 | 11/2013 | |
| WO | 2012/093599 | * 7/2012 | ............. B01J 23/68 |
| WO | 2012093599 A1 | 7/2012 | |
| WO | 2012093600 A1 | 7/2012 | |

* cited by examiner

CATALYST COMPOSITION FOR PURIFYING EXHAUST GAS AND EXHAUST GAS PURIFYING CATALYST

TECHNICAL FIELD

The present invention relates to a catalyst composition for purifying exhaust gas and an exhaust gas purifying catalyst which can be used to purify the exhaust gas discharged from an internal combustion engine. Among them, a catalyst composition for purifying exhaust gas and an exhaust gas purifying catalyst which contain a manganese-based composite oxide such as yttrium manganite composite oxide (also referred to as "YMO" in the present specification).

BACKGROUND ART

The exhaust gas from motor vehicles which use gasoline as the fuel contains harmful components such as hydrocarbons (HC), carbon monoxide (CO), and nitrogen oxides (NOx). It is required to purify each of the harmful components by using a catalyst so that the hydrocarbons (HC) are converted into water and carbon dioxide by oxidation, the carbon monoxide (CO) is converted into carbon dioxide by oxidation, and the nitrogen oxides (NOx) are converted into nitrogen by reduction.

As a catalyst (hereinafter referred to as the "exhaust gas purifying catalyst") for treating such an exhaust gas, a three way catalyst (TWC) capable of redoxing CO, HC, and NOx is used.

As such a three way catalyst, those that are obtained by supporting a precious metal such as platinum (Pt), palladium (Pd), or rhodium (Rh) on a refractory oxide porous material having a high specific surface area, for example, an alumina porous material having a high specific surface area and supporting this on a substrate, for example, a monolithic substrate which is made of a refractory ceramic or a metal and has a honeycomb structure or those that are obtained by supporting this on refractory particles are known.

In recent years, an invention has been disclosed which is intended to use yttrium manganite composite oxide (YMO) as an oxidation catalyst for purifying exhaust gas although it is used as an oxidation catalyst for diesel engine.

For example, an oxidation catalyst for purifying exhaust gas that is composed of a composite metal oxide represented by a general formula $Y_{1-x}Ag_xMnO_3$ ($0.01 \leq x \leq 0.15$) or a general formula $Y_{1-x}Ag_xMn_{1-y}A_yO_3$ (A is one kind of metal selected from the group consisting of Ti, Nb, Ta, and Ru. $0.005 \leq y \leq 0.2$) is disclosed in Patent Document 1 (JP 2008-100184 A).

An oxidation catalyst composed of a mixture of any one kind of composite metal oxide among the composite metal oxides that are represented by a general formula $Y_{1-x}Ag_xMn_{1-y}A_yO_3$, in which A is one kind of metal selected from the group consisting of Ti, Ce, and Ru, $0.01 \leq x \leq 0.30$, and $0.005 \leq y \leq 0.30$ and zirconium oxide is disclosed in Patent Document 2 (JP 2009-279579 A).

An oxidation catalyst composed of any one kind of composite metal oxide represented by a chemical formula $YMnO_3$, $Y_{1-x}Ag_xMnO_3$ ($0.01 \leq x \leq 0.30$), $Y_{1-x}Ag_xMn_{1-y}A_yO_3$ ($0.01 \leq x \leq 0.30$ and $0.005 \leq y \leq 0.30$, and A is any one kind of metal of Ti, Nb, Ta, Ru, Ce, or Fe) is disclosed in Patent Document 3 (JP 2010-284583 A.).

An oxidation catalyst for purifying exhaust gas which contains a composite metal oxide represented by a general formula $Y_{1-x}Ag_xMn_{1-y}Fe_yO_3$ ($0.01 \leq x \leq 0.30$ and $0.01 \leq y \leq 0.50$) is disclosed in Patent Document 4 (JP 2010-284584 A).

A catalyst for purifying exhaust gas which contains a double oxide in which the site A contains Y, the site B contains Mn, and the composition ratio B/A of the site B to the site A is greater than 2 and which is composed of a crystal taking a structure $DyMn_2O_5$ is disclosed in Patent Document 5 (JP 2013-233541 A).

A catalyst for purifying exhaust gas which contains a catalyst support composed of a ceramic or a metallic material, a double oxide $Y_{1-x}A_xMn_{2-z}B_zO_5$ (in the formula, A is La, Sr, Ce, Ba, Ca, Sc, Ho, Er, Tm, Yb, Lu, or Bi, B is Co, Fe, Ni, Cr, Mg, Ti, Nb, Ta, Cu, or Ru, $0.5 \geq x \geq 0$, and $1 \geq z \geq 0$) that is supported on the catalyst support, and at least one kind of atom that is selected from the group consisting of Ag, Pt, Au, Pd, Rh, Cu, and Mn and supported on the double oxide $Y_{1-x}A_xMn_{2-z}B_zO_5$ is disclosed in Patent Document 6 (WO 2012/093599 A) as a catalyst for exhaust gas which exhibits excellent oxygen occluding properties and is used to purify the exhaust gas discharged from an internal combustion engine of a motor vehicle or the like.

In addition, a catalyst for purifying exhaust gas that is composed of a tetragonal composite oxide represented by a general formula. $A_2BO_4$ (in the general formula, A represents at least one kind selected from the group consisting of Ca, Sr, and Ba, and B represents at least one kind selected from the group consisting of Mn, Fe, Ti, Sn, and V), a refractory inorganic oxide in which at least the surface layer is composed of $MgAl_2O_4$, and a precious metal component that is present in the tetragonal composite oxide in the form of a solid solution or supported on the tetragonal composite oxide or the refractory inorganic oxide is disclosed in Patent Document 7 (JP 2006-26554 A) as a catalyst composition for purifying exhaust gas which contains particles containing a manganese-containing composite oxide.

An exhaust gas purifying catalyst having a support formed of an oxide, a great number of palladium oxide (PdO) particles which are supported on the support and have an average particle size of 1 nm or more and 50 nm or less, two or more kinds of composite oxides selected from Mn, Fe, Co, or Ni as the promotor particles, a great number of rare earth oxide (LnOx) particles which are in contact with the palladium oxide (PdO) particles and supported on the support and have an average particle size of from 11 nm to 50 nm is disclosed in Patent Document 8 (JP 2007-105633 A).

CITATION LIST

Patent Document

Patent Document 1: JP 2008-100184 A
Patent Document 2: JP 2009-279579 A
Patent Document 3: JP 2010-284583 A
Patent Document 4: JP 2010-284584 A
Patent Document 5: JP 2013-233541 A
Patent Document 6: WO 2012/093599 A
Patent Document 7: JP 2006-26554 A
Patent Document 8: JP 2007-105633 A

SUMMARY OF THE INVENTION

Problem to be Solved by the Invention

The price of the catalyst is greatly dependent on the amount of the precious metal contained as the catalytically active component, and the development of a catalyst to decrease the amount of the precious metal has been actively carried out for the purpose of suppressing the price of catalyst as low as possible.

The invention relates to a catalyst composition for purifying exhaust gas and an exhaust gas purifying catalyst which contain a manganese-containing composite oxide, and an object thereof is to provide a novel catalyst composition for purifying exhaust gas and a novel exhaust gas purifying catalyst which can sufficiently function as an exhaust gas purifying catalyst even without supporting a precious metal as a catalytically active component.

Means for Solving Problem

The invention proposes a catalyst composition for purifying exhaust gas in which particles containing a manganese-containing composite oxide (also referred to as the "Mn-based oxide") (also referred to as the "Mn-based oxide particles") and particles containing a metal of Group 5 to Group 11 having an electron in the d orbital (however, Mn, Pt, Rh, and Pd are excluded) or an oxide of the metal (also referred to as the "mixed metal-oxide") (also referred to as the "mixed metal-oxide particles") are present in a mixed state.

Effect of the Invention

The catalyst composition for purifying exhaust gas proposed by the invention can sufficiently function as an exhaust gas purifying catalyst even without supporting a precious metal as a catalytically active component. Hence, according to the invention, it is possible to provide an exhaust gas purifying catalyst excellent in purification performance at low cost.

MODE(S) FOR CARRYING OUT THE INVENTION

Figure 1:
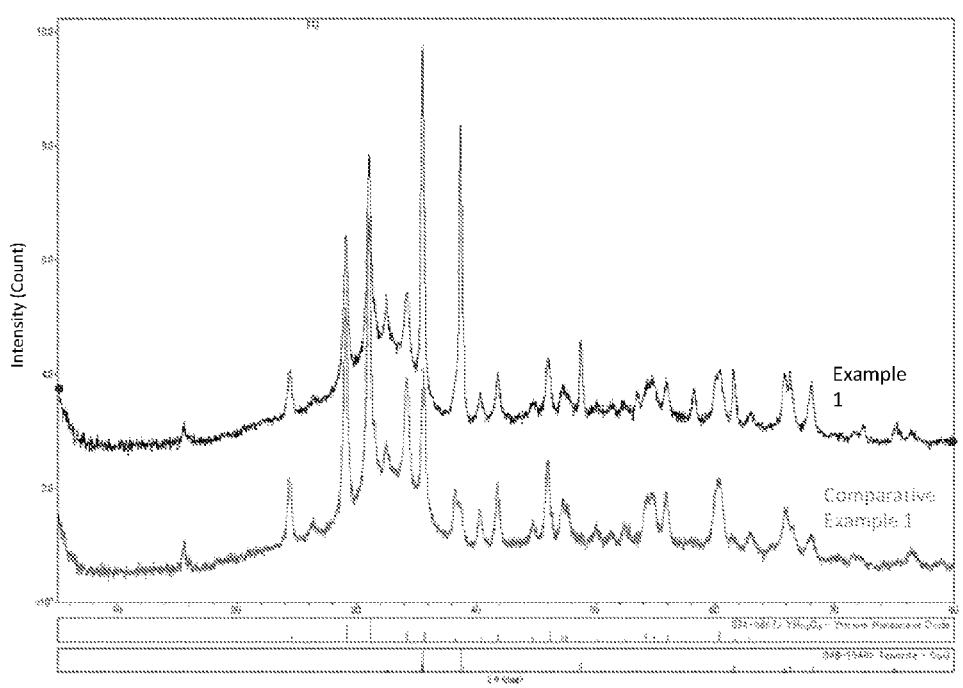
FIG. 1 is a view illustrating the XRD patterns of the catalyst compositions obtained in Example 1 and Comparative Example 1 side by side.
Figure 2:
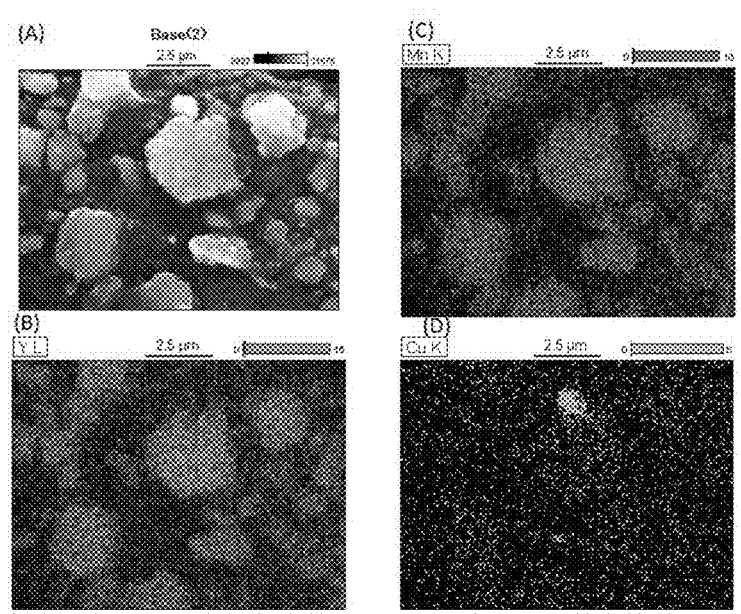
FIG. 2(A) is an image of the catalytic composition obtained in Example 1 as a base for EDXS Mapping taken by a SEM.
FIG. 2(B) is a view illustrating the distribution state of Y thereof.
FIG. 2(C) is a view illustrating the distribution state of Mn thereof.
FIG. 2(D) is a view illustrating the distribution state of Cu thereof.
Figure 3:
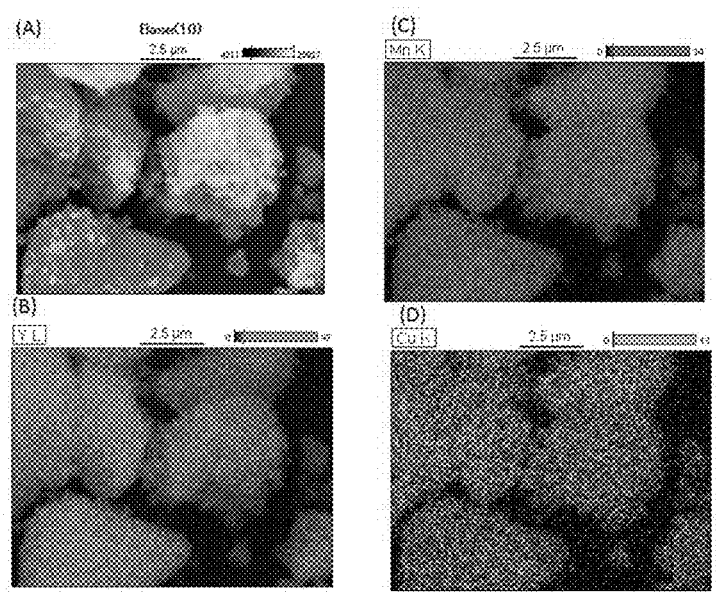
FIG. 3(A) is an image of the catalyst composition obtained in Comparative Example 1 as a base for EDX Mapping taken by a SEM.
FIG. 3(B) is a view illustrating the distribution state of Y thereof.
FIG. 3(C) is a view illustrating the distribution state of Mn thereof.
FIG. 3(D) is a view illustrating the distribution state of Cu thereof.

Next, embodiments of the invention will be described. However, the invention is not limited to the embodiments to be described below.

<Present Catalyst Composition>

The catalyst composition for purifying exhaust gas according to an example of the embodiments of the invention (referred to as the "present catalyst composition") is a catalyst composition for purifying exhaust gas in which the Mn-based oxide particles and the mixed metal-oxide particles are present in a mixed state.

A catalyst composition for purifying exhaust gas in which the Mn-based oxide particles and the mixed metal-oxide particles are present in a mixed state can sufficiently function as an exhaust gas purifying catalyst even without supporting a precious metal as a catalytically active component.

The present catalyst composition is suitable for the purification of exhaust gas from an internal combustion engine, and it can be applied as a catalyst for either of a gasoline motor vehicle or a diesel motor vehicle.

Especially, it is suitable as a three way catalyst for a gasoline motor vehicle.

<Mn-Based Oxide Particles>

The Mn-based oxide particles may be any particles which contain a manganese-containing composite oxide.

The particles containing a manganese-containing composite oxide are even more preferable from the viewpoint of increased heat resistance as compared to the case of containing manganese oxide and decreased concern that CuO or the like is embedded in the Mn-containing particles by the reaction of the manganese-containing particles with CuO or the like.

In the Mn-based oxide particles, it is preferable that the manganese-containing composite oxide accounts for 95% by mass or more of the entire particles from the viewpoint of securing the purification performance thereof, and among them, it is preferable that it accounts for 99% by Mass or more (including 100% by mass). At this time, the fact that the manganese-containing composite oxide accounts for 100% by mass means that the components other than inevitable impurities are all the manganese-containing composite oxide.

Examples of the manganese-containing composite oxide may include yttrium manganite, lanthanum manganite, praseodymium manganite, neodymium manganite, calcium manganate, strontium manganate, and barium manganate. Among them, a manganese rare earth composite oxide, and manganese alkaline earth metal composite oxide are preferable, and among them, yttrium manganite composite oxide is even more preferable.

The yttrium manganite composite oxide may be a composite oxide containing manganese and yttrium. Examples thereof may include one kind or a mixture of two or more kinds selected from the group consisting of $YMn_2O_5$, $Y_{1-x}A_xMn_{2-z}B_zO_5$ (in the formula, A is La, Sr, Ce, Ba, Ca, Sc, Ho, Er, Tm, Yb, Lu, or Bi, B is Co, Fe, Ni, Cr, Mg, Ti, Nb, Ta, Cu, or Ru, $0.5 \geq x \geq 0$, and $1 \geq z \geq 0$), $YMnO_3$, $Y_{1-x}A_xMn_{1-z}B_zO_3$ (in the formula, A is La, Sr, Ce, Ba, Ca, Sc, Ho, Er, Tm, Yb, Lu, or Bi, B is Co, Fe, Ni, Cr, Mg, Ti, Nb, Ta, Cu, or Ru, $0.5 \geq x \geq 0$, and $1 \geq z \geq 0$), and $Y_2Mn_2O_7$. Among them, one kind or a mixture of two or more kinds selected from the group consisting of $YMn_2O_5$ and $Y_{1-x}A_xMn_{2-z}B_zO_5$ (in the formula, A is La, Sr, Ce, Ba, Ca, Sc, Ho, Er, Tm, Yb, Lu, or Bi, B is Co, Fe, Ni, Cr, Hg, Ti, Nb, Ta, Cu, or Ru, $0.5 \geq x \geq 0$, and $1 \geq z \geq 0$) are preferable from the viewpoint of exhaust gas purification performance when being mixed with the mixed metal-oxide particles, and among them, $YMn_2O_5$ is preferable.

It is preferable that D50 of the Mn-based oxide particles, namely, the volume cumulative particle size D50 measured by a laser diffraction scattering particle size distribution measuring apparatus is from 1 μm to 30 μm. It is easy to secure the purification performance and it is also possible to improve the production stability when D50 of the Mn-based oxide particles is in such a range.

<Mixed Metal-Oxide Particles>

The mixed metal-oxide particles described above may be particles which contain a metal of Group 5 to Group 11 having an electron in the d orbital or an oxide of the metal.

However, manganese (Mn) that is the main component of the Mn-based oxide particles, platinum (Pt) as the platinum group, rhodium (Rh), and palladium (Pd) are excluded from the "metal of Group 5 to Group 11 having an electron in the d orbital". Hereinafter, the same applies.

In a case in which the particles which contain a metal of Group 5 to Group 11 having an electron in the d orbital or an oxide of the metal and the Mn-based oxide particles are present in a mixed state, the Mn-based oxide of which the valence is easily changed donates or receives an electron to or from the metal of Group 5 to Group 11 having an electron in the d orbital or an oxide of the metal in the mixed metal-oxide particles that are present in the vicinity of the Mn-based oxide in association with a change in atmosphere of redox. In other words, as the Mn-based oxide donates or receives an electron to or from the mixed metal-oxide, the adsorption and dissociation of the gas to or from the metal of Group 5 to Group 11 having an electron in the d orbital or an oxide of the metal is promoted and the catalytic activity is enhanced.

On the other hand, when the mixed metal-oxide particles are supported on the Mn-based oxide, sintering of the Mn-based oxide is promoted and it is concerned that the catalyst is deactivated.

Hence, it is considered that both of them are preferably present in a mixed state.

In the mixed metal-oxide particles, from the viewpoint of enhancing the NOx purification performance, it is preferable that the metal of Group 5 to Group 11 having an electron in the d orbital or an oxide of the metal accounts for 85% by mass or more, and it is preferable that it accounts for 95% by mass or more among them and it accounts for 99% by mass or more (including 100% by mass) among them. At this time, the fact that the metal of Group 5 to Group 11 having an electron in the d orbital or an oxide of the metal accounts for 100% by mass means that the components other than inevitable impurities are all the metal of Group 5 to Group 11 having an electron in the d orbital or an oxide of the metal.

The electron affinity is stronger, the exchange of the electron to the exhaust gas component easily takes place, and the catalytic activity is enhanced when the "d orbital" of the metal of Group 5 to Group 11 having an electron in the d orbital or an oxide of the metal is filled with more electrons. Hence, it is desirable to employ a metal or an oxide thereof which has 3 or more d electrons in the state of a metal. For example, the d electrons are eliminated when being ionized in the case of Zr of Group 4, and thus it is preferable to contain an element of Group 5 or higher.

In addition, the exchange of electron more easily takes place when there is a vacancy in the orbital, and thus the electron occupying the S orbital is desirably one when the d orbital is filled (10). From this point of view, a metal to Group 11 having an electron in the d orbital is favorable, and thus it is preferable to contain an element of Group 5 to Group 11.

From this point of view, in a case in which there are 3 or more d electrons and the d orbital is filled in the state of a metal, an element which has one electron in the S orbital, for example, those composed of one kind or a combination of two or more kinds selected from the group consisting of V, Cr, Mn, Fe, Co, Ni, Cu, Nb, Mo, Ag, Ta, and W are preferable. Among them, those composed of one kind or a combination of two or more kinds selected from the group consisting of Fe, Co, Ni, Ag, and Cu are even more preferable from the viewpoint of suppressing the production cost, and copper or silver is even more preferable among them.

In a case in which the mixed metal-oxide particles are copper or an oxide thereof, the copper-copper oxide particles may be particles which contain those composed of one kind or a combination of two or more kinds selected from the group consisting of copper (Cu), copper oxide (I) ($Cu_2O$), and copper oxide (II) (CuO). In a case in which the mixed metal-oxide particles are silver or an oxide thereof, the silver-silver oxide particles may be particles which contain those composed of one kind or a combination of two or more kinds selected from the group consisting of silver (Ag) and silver oxide ($Ag_2O$). In addition, it may be a mixture of particles containing any one or more kinds of copper, copper oxide, silver, or silver oxide.

It is preferable that D50 of the mixed metal-oxide particles, namely, the volume cumulative particle size D50 measured by a laser diffraction scattering particle size distribution measuring apparatus is from 0.2 μm to 10 μm in order to secure the purification performance and the production stability, and among them, it is even more preferably 1 μm or more or 7 μm or less.

Incidentally, the metal and the oxide thereof contained in the present catalyst are reversibly switched by the redox reaction in association with a change in A/F ratio of the gas discharged from the engine when the catalyst is actually used, and thus it is presumed that the same effect is exerted when the metal source to be first added is a metal powder or a metal oxide.

However, it is even more preferable to use a metal oxide in which oxygen is reliably contained to the inside of the particles.

Incidentally, The "A/F ratio" stands for the Air/Fuel and is a numerical value indicating the ratio of air to fuel.

(Mixed State)

In the present catalyst composition, it is required that the Mn-based oxide particles and the mixed metal-oxide particles are present in a mixed state.

The present catalyst composition can sufficiently function as a catalyst even without supporting a precious metal when the Mn-based oxide particles and the mixed metal-oxide particles are present in a mixed state. In addition, superior catalytic activity is exerted as compared to a case in which the mixed metal-oxide particles are present in a state of being supported on the Mn-based oxide particles, and remarkably excellent catalytic activity is exerted particularly for the NO purification performance.

Here, the term "they are present in a mixed state" refers to a state in which each of these two kinds of particles can be confirmed as particles, and more specifically, it refers to a state in which one is not supported on the other. In addition, whether "they are present in a mixed state" or not can be confirmed by the magnitude of the average particle size of the two kinds of particles or the intensity ratio of the diffraction peaks in the XRD patterns as to be described below.

(Size of Particles)

In the present catalyst composition, it is preferable that the average particle size of the mixed metal-oxide particles is from 3 to 300% of the average particle size of the Mn-based oxide particles. It can be said that the Mn-based oxide particles and the mixed metal-oxide particles are present in a mixed state when they are in such a relation. In addition, it is possible to favorably maintain the contact of the mixed metal-oxide particles with the Mn-based oxide particles when the average particle size of the mixed metal-oxide particles is 3% or more of the average particle size of the Mn-based oxide particles, and it is possible to secure the active site of Cu when it is 300% or less.

Consequently, from this point of view, the average particle size of the mixed metal-oxide particles is preferably from 3 to 300% of the average particle size of the Mn-based oxide particles, it is even more preferably 10% or more or 200% or less among them, and it is even more preferably 20% or more or 150% or less among them.

Here, the "average particle size of the mixed metal-oxide particles" and the "average particle size of the Mn-based oxide particles" are the average value of the particle size obtained by measuring the size of the respective particles from a photograph taken by a SEM.

(Peak Intensity)

In addition, in the present catalyst composition, it is preferable that the intensity of the main peak among the diffraction peaks attributed to the mixed metal-oxide is 5% or more of the intensity of the main peak among the diffraction peaks attributed to the Mn-based oxide in the XRD pattern determined by the XRD measurement (Cu/Kα). It can be said that the Mn-based oxide particles and the mixed metal-oxide particles are present in a mixed state when they are in such a relation.

The "main peak among the diffraction peaks attributed to the mixed metal-oxide" means a diffraction peak which has the highest peak intensity among the diffraction peaks in a case in which there are a plurality of diffraction peaks attributed to the mixed metal-oxide.

In addition, the "main peak among the diffraction peaks attributed to the Mn-based oxide" means a diffraction peak which has the highest peak intensity among the diffraction peaks in a case in which there are a plurality of diffraction peaks attributed to the Mn-based oxide.

Incidentally, in a case in which the "main peak among the diffraction peaks attributed to the mixed metal-oxide" and the "main peak among the diffraction peaks attributed to the Mn-based oxide" overlap each other, namely, in a case in which 2θ (deg) of the respective main peaks approximates to each other so that the peak intensity of the respective main peaks cannot be accurately determined, the peak having secondly highest intensity is adopted as the main peak for each of the diffraction peaks attributed to the mixed metal-oxide and the Mn-based oxide.

It has been confirmed in Examples and Comparative Examples to be described later that excellent catalytic activity is exerted and remarkably excellent catalytic activity is exerted particularly for NOx when the intensity of the main peak among the diffraction peaks attributed to the mixed metal-oxide is 5% or more of the intensity of the main peak among the diffraction peaks attributed to the Mn-based oxide in the present catalyst composition. This intensity ratio does not have the upper limit, but it is empirically about 500% at the maximum.

Consequently, from this point of view, in the present catalyst composition, it is preferable that the intensity of the main peak among the diffraction peaks attributed to the mixed metal-oxide is 5% or more of the intensity of the main peak among the diffraction peaks attributed to the Mn-based oxide, and it is even more preferable that it is from 10 to 500% among them and it is 20% or more or 200% or less among them.

For example, when a case in which the Mn-based oxide particles are a composite oxide which contains manganese and yttrium (referred to as the "YMO particles") and the mixed metal-oxide particles are particles which contain copper or copper oxide is taken as an example, it is preferable that the intensity of the main peak appearing at 2θ (deg)=48 to 50° as the diffraction peak of copper or copper oxide is from 5 to 70% of the intensity of the main peak appearing at 2θ (deg)=30 to 32° as the diffraction peak of the yttrium manganite composite oxide in the XRD pattern obtained by the XRD measurement (Cu/Kα).

It has been confirmed in Examples and Comparative Examples to be described later that excellent catalytic activity is exerted and remarkably excellent catalytic activity is exerted particularly for NOx when the intensity of the main peak appearing at 2θ (deg)=48 to 50° is from 5 to 70% of the intensity of the main peak appearing at 2θ (deg)=30 to 32° as the diffraction peak in the present catalyst composition.

Consequently, from this point of view, in the present catalyst composition, it is preferable that the intensity of the main peak appearing at 2θ (deg)=48 to 50° is from 5 to 70% of the intensity of the main peak appearing at 2θ (deg)=30 to 32° as the diffraction peak, it is even more preferably 10% or more or 60% or less among them, and it is even more preferably 20% or more or 50% or less among them.

Incidentally, the "main peak appearing at 2θ (deg)=48 to 50°" means the peak having the highest intensity among the peaks in a case in which a plurality of peaks can be confirmed in a range of 2θ (deg)=48 to 50°.

The "main peak appearing at 2θ (deg)=30 to 32°" means the peak having the highest intensity among the peaks in a case in which a plurality of peaks can be confirmed in a range of 2θ (deg)=30 to 32°.

(Mixing Ratio)

In the present catalyst composition, it is preferable that the content of the mixed metal-oxide particles (however, the amount in terms of metal excluding the amount of oxygen (O) in the case of an oxide) is from 1 to 60 parts by mass with respect to 100 parts by mass of the sum of the content of the mixed metal-oxide particles and the content of the Mn-based oxide particles.

It is possible to exert excellent catalytic activity when the content of the mixed metal-oxide particles is in the range described above in the present catalyst composition.

Consequently, from this point of view, in the present catalyst composition, it is preferable that the content of the mixed metal-oxide particles is from 1 to 60 parts by mass with respect to 100 parts by mass of the sum of the content of the mixed metal-oxide particles and the content of the Mn-based oxide particles, and it is even more preferably 4 parts by mass or more or 35 parts by mass or less among them.

At this time, it is possible to further enhance the CO purification performance while maintaining the HC and NOx purification performance when the content of the mixed metal-oxide particles is from 4 to 35 parts by mass with respect to 100 parts by mass of the sum of the content of the mixed metal-oxide particles and the content of the Mn-based oxide particles. From this point of view, the content of the mixed metal-oxide particles is even more preferably 6 parts by mass or more or 13 parts by mass or less.

(Precious Metal)

The present catalyst composition has a feature to be able to sufficiently function as a catalyst even without supporting a precious metal such as Ru, Rh, Pd, Ag, Os, Ir, Pt, or Au, for example. Consequently, the present catalyst composition may not support a precious metal. It is advantageous from the viewpoint of production cost that the present catalyst composition does not support such a precious metal, particularly Ru, Rh, Pd, Ag, Os, Ir, Pt, or Au.

However, it is also possible to support a precious metal if necessary.

At this time, examples of the preferred precious metal to be supported as a catalytically active component may include palladium (Pd), platinum (Pt), and rhodium (Rh), and it is possible to use one kind or two or more kinds among these in combination.

(Other Components)

The present catalyst composition may contain other components other than the Mn-based oxide particles and the mixed metal-oxide particles (these are referred to as the "present catalyst particles").

For example, the present catalyst composition may contain other catalyst particles formed by supporting a catalytically active component such as a precious metal on inorganic porous particles, OSC material particles, a stabilizer, a binder, and other additive components.

As the binder component, it is possible to use an inorganic binder, for example, an aqueous solution such as alumina sol, silica sol, or zirconia sol. These can take the form of an inorganic oxide when being calcined.

However, in the present catalyst composition, it is preferable that the present catalyst particles account for at least 50% by mass or more of the total amount of the present catalyst particles and the other catalyst particles, they account for 70% by mass or more among them, and they account for 90% by mass or more among them.

Examples of the inorganic porous particles constituting the other catalyst particles may include a porous material composed of a compound selected from the group consisting of silica, ceria, ceria-zirconia, alumina, and titania, more specifically, examples thereof may include a porous material of a compound selected from the group consisting of alumina, silica, silica-alumina, an alumino-silicate, alumina-zirconia, alumina-chromia, and alumina-ceria.

Examples of the precious metal constituting the catalyst particles may include a metal such as platinum, rhodium, or palladium.

The OSC material particles may be particles composed of a material having the oxygen storage capacity (OSC). Examples thereof may include cerium compound particles, zirconium compound particles, and ceria-zirconia particles.

The present catalyst composition may contain a stabilizer. Examples of this kind of stabilizer may include an alkaline earth metal and an alkali metal. Among them, it is possible to select one kind or two or more kinds among the metals selected from the group consisting of magnesium, barium, calcium, and strontium, and suitably strontium and barium.

(Method for Producing Present Catalyst Composition)

It is possible to obtain the slurry-like present catalyst composition, for example, by mixing and stirring a particle powder containing Mn-based oxide particles, a particle powder containing mixed metal-oxide particles, water, and other raw materials if necessary. In addition, it is also possible to obtain the powdery present catalyst composition by drying the slurry-like present catalyst composition if necessary.

<Present Catalyst>

Next, an exhaust gas purifying catalyst (hereinafter, referred to as the "present catalyst") can be produced by using the present catalyst composition will be described.

The present catalyst can be fabricated by supporting the present catalyst composition on a substrate.

In addition, the present catalyst can be fabricated by molding the present catalyst composition into a pellet shape.

Examples of a specific configuration example of the present catalyst may include a catalyst having a configuration that is formed by fabricating a slurry by mixing the present catalyst composition with water and other components and stirring the mixture by a ball mill, and coating, drying, and calcining this slurry on a substrate so as to form a catalyst layer.

In addition, examples thereof may include a catalyst that is formed by fabricating a slurry by mixing the present catalyst composition with water and other components and stirring the mixture by a ball mill, then immersing a substrate in this slurry, and pulling up and calcining this so as to form a catalyst layer on the substrate surface.

However, it is possible to employ any known method as the method for producing the present catalyst, and the method is not limited to the above examples.

(Substrate)

Examples of the material for the substrate used in the present catalyst may include a refractory material such as ceramics or a metal material.

Examples of the material for the ceramic substrate may include a refractory ceramic material, for example, cordierite, cordierite-alpha alumina, silicon nitride, zircon mullite, spodumene, alumina-silica magnesia, zircon silicate, sillimanite, magnesium silicate, zircon, petalite, alpha alumina, and an aluminosilicate.

Examples of the material for the metal substrate may include a refractory metal, for example, other suitable corrosion resistant alloys containing stainless steel or iron as the base.

Examples of the shape of the substrate may include a honeycomb shape, a pellet shape, and a spherical shape.

In the case of using a substrate having a honeycomb shape, for example, it is possible to use a monolithic substrate having a great number of parallel and fine gas flow passages, namely, channels in the inside of the substrate so that the gas flows through the inside of the substrate. At this time, a catalyst layer can be formed by coating the catalyst composition on the respective channel inner wall surface of the monolithic substrate by wash coating or the like.

As the substrate having a honeycomb shape, it is preferable to use a substrate which has an inner flow passage area to demarcate the inner radius region and an outer flow passage area to demarcate the outer radius region and is configured so that more exhaust gas passes through the inner flow passage area as compared to the outer flow passage area. By using such a substrate, more convective heat is concentrated in the central region, and thus it is possible to accelerate the rate of temperature increase and to enhance the exhaust gas purification performance at the initial stage of engine start.

(Catalyst Layer)

The catalyst layer may be laminated on a substrate in one layer or two or more layers, and different catalyst layers may be formed on the upstream side and the downstream side when the exhaust gas flows through.

<Description of Phrase>

In the present specification, in a case in which it is expressed by "X to Y" (X and Y are an arbitrary number), it includes the meaning of "preferably greater than X" or "preferably less than Y" as well as the meaning of "X or more and Y or less" unless otherwise stated.

In addition, in a case in which it is expressed by "X or more" is an arbitrary number) or "Y or less" (Y is an arbitrary number), it also includes the intention that "it is preferable to be greater than X" of "it is preferable to be less than Y".

In addition, the "Group 5 to Group 11" refers to an element of Group 5 to Group 11 referred to in the long periodic table.

EXAMPLES

Hereinafter, the invention will be described in more detail based on the following Examples and Comparative Examples.

Example 1

The catalyst composition A was obtained by crushing, mixing, drying, and calcining 90 parts by mass of a YMn2O5 powder (D50: 60 μm) as the Mn-based oxide particles and 10 parts by mass of a copper oxide particle powder (purity of CuO: 90%, D50: 4 μm) in terms of copper metal as the mixed metal-oxide particles, and water.

Incidentally, the term "90 parts by mass of a $YMn_2O_5$ powder" means that the content proportion ($YMn_2O_5$/Cu+$YMn_2O_5$) of the $YMn_2O_5$ powder with respect to 100 parts by mass of the total content of copper (Cu) in CuO in terms of copper metal excluding O and $YMn_2O_5$ is 90 parts by mass (the same applies in Examples and Comparative Examples to be described below).

Furthermore, the term "10 parts by mass of copper oxide particle powder in terms of copper metal" means that the content proportion (Cu/Cu+$YMn_2O_5$) of copper in CuO in terms of copper metal excluding O with respect to 100 parts by mass of the total content of copper (Cu) in CuO in terms of copper metal excluding O and $YMn_2O_5$ is 10 parts by mass (the same applies in Examples and Comparative Examples to be described below).

Comparative Example 1

In conformity to Example 21 in WO 2012/093599 A, $YMn_2O_5$ supporting copper was fabricated. In other words, 10 parts by mass of copper sulfate trihydrate in terms of copper metal was introduced into ion exchanged water and stirred to be dissolved. After the copper sulfate was completely dissolved, 90 parts by mass of a $YMn_2O_5$ powder (D50: 60 μm) in terms of oxide was introduced thereinto and stirred to be dispersed. Subsequently, the resultant was subjected to vacuum deaeration at 60° C., evaporated to dryness, and calcined, thereby obtaining a $YMn_2O_5$ powder supporting copper. This $YMn_2O_5$ powder, a binder, and water were crushed, mixed, dried, and calcined, thereby obtaining the catalyst composition B.

<Exhaust Gas Purification Performance Test 1>

The exhaust gas purifying catalyst was subjected to the endurance test at 900° C. for 8 hours in the air, and the performance was then compared with each other. The catalyst compositions A and B were respectively filled in a separate evaluation apparatus, and the purification performance thereof for the simulated exhaust gas was measured by using a fixed bed flow type reactor. Specifically, the catalyst powder was set in the reaction tube by 0.3 g, CO, $C_3H_6$, NO, $O_2$, $CO_2$, $H_2O$, $H_2$, and $N_2$ were mixed together at 10° C./min and the air to fuel ratio (A/F) of 14.3 as the simulated exhaust gas, the catalyst powder was introduced into the simulated exhaust gas at a total flow rate of 1000 cc/min, the measurement was conducted.

The temperature (° C.) at which CO is purified by 50% (CO-T50), the temperature (° C.) at which HC is purified by 20% (HC-T20), the temperature (° C.) at which NO is purified by 50% (NO-T50), and the purification rate (CO-η400(%), HC-η400(%), NO-η400(%)) of each of CO, HC, and NO at 400° C. were as presented in Table 1.

TABLE 1

| | Catalyst component | | | Three way purification performance | | | | | |
|---|---|---|---|---|---|---|---|---|---|
| | Mixed metal-oxide particles | Mn-based oxide particles | State | CO-T50 (° C.) | HC-T20 (° C.) | NO-T50 (° C.) | CO η400 (%) | HC-η400 (%) | NO-η400 (%) |
| Comparative Example 1 (catalyst composition B) | CuO | $YMn_2O_5$ | Supported | 330 | 366 | 376 | 80.3 | 23.1 | 74.5 |
| Example 1 (catalyst composition A) | CuO | $YMn_2O_5$ | Physically mixed | 297 | 322 | 351 | 87.8 | 27.6 | 90.5 |

(Discussion)

The catalyst compositions A and B obtained in Example 1 and Comparative Example 1 were subjected to the component observation using EDX as well as the observation by FE-SEM, and as a result, it was possible to observe the YMO particles and the copper oxide particles, respectively, so as to confirm that both of the particles were present in a mixed state in the catalyst composition A obtained in Example 1.

The average particle size of the YMO particles and the copper oxide particles was measured from a photograph taken by a SEM, and as a result, the average particle size of the YMO particles was 5 μm and the average particle size of the copper oxide particles was 2 μm.

On the other hand, it was not possible to confirm the copper-copper oxide particles having a particle size of 2 μm or more in the catalyst composition B obtained in Comparative Example 1.

In addition, the catalyst compositions A and B obtained in Example 1 and Comparative Example 1 were analyzed by the XRD measurement (Cu/Kα), and as a result, the intensity of the main peak appearing at 2θ (deg)=48 to 50° was 35% of the intensity of the main peak appearing at 2θ (deg)=30 to 32° for the catalyst composition A obtained in Example 1.

On the other hand, the peak appearing at 2θ (deg)=48 to 50° was not present for the catalyst composition B obtained in Comparative Example 1.

It has been found that the catalyst composition can sufficiently function as a three way catalyst even without supporting a precious metal when the YMO particles and the copper-copper oxide particles are present in a mixed state from Example and Comparative Example described above and the results of the tests which the inventors have conducted. In addition, it has been confirmed that the catalyst composition exerts excellent three way catalytic activity and exerts remarkably excellent effect particularly in the NOx purification performance as compared to a case in which the copper-copper oxide particles are present in a state of being supported on the YMO particles.

In addition, it has been presumed that it is even more preferable that the average particle size of the copper-copper oxide particles is from 3 to 70% of the average particle size of the YMO particles, it is 103 or more or 60% or less among them, and it is 20% or more or 50% or less among them from Example and Comparative Example described above and the results of the tests which the inventors have conducted.

Furthermore, it has been found that it is even more preferable that the intensity of the main peak appearing at $2\theta$ (deg)=48 to 50° as the diffraction peak of the copper or copper oxide is from 10 to 70% of the intensity of the main peak appearing at $2\theta$ (deg)=30 to 32° as the diffraction peak of the yttrium manganite composite oxide and it is 20% or more or 50% or less among them in the XRD pattern obtained by the XRD measurement (Cu/K$\alpha$).

Incidentally, the effect has been confirmed by using $YMn_2O_5$ particles as the YMO particles in Example described above, but for example, it is possible to understand that the YMO particles have the same nature as long as they are yttrium manganite composite oxide containing Y and Mn such as $YMn_2O_5$ and $Y_{1-x}A_xMn_{2-z}B_zO_5$ (in the formula, A is La, Sr, Ce, Ba, Ca, Sc, Ho, Er, Tm, Yb, Lu, or Bi, B is Co, Fe, Ni, Cr, Mg, Ti, Nb, Ta, Cu, or Ru, $0.5 \geq x \geq 0$, and $1 \geq z \geq 0$), for example, from the description in [0017] to [0080] of WO 2012/093599 A as well.

Hence, it is possible to understand that the YMO particles other than $YMn_2O_5$, namely, yttrium manganite composite oxide containing Y and Mn also exert the same performance as the $YMn_2O_5$ particles.

Furthermore, it is considered that the effect of the YMO particles is greatly affected by a change in valence of manganese, and thus the same effect as that of the YMO particles can be expected as long as the particles are particles composed of a manganese-containing composite oxide even though they are particles other than the YMO particles.

From this point of view, it is possible to expect the same effect, for example, even when manganese-based oxide particles such as manganese oxide, yttrium manganite, lanthanum manganite, praseodymium manganite, neodymium manganite, calcium manganate, strontium manganate, and barium manganate instead of the YMO particles.

Example 2

The slurry-like catalyst composition C was obtained in the same manner as in Example 1 except that the mass proportion of the $YMn_2O_5$ powder was set to 95 parts by mass and the mass proportion of the copper oxide particle powder was set to 5 parts by mass.

<Exhaust Gas Purification Performance Test 2>

A honeycomb substrate made of $\phi25.4$ mm×L 30 mm–400 cell cordierite was immersed in the slurry-like catalyst composition A or C obtained in Example 1 and Example 2, and pulled up, the excess slurry was blown off therefrom, and the honeycomb substrate was dried and calcined for 1 hour at 500° C. to form a coating layer, thereby obtaining an exhaust gas purifying catalyst (sample). The amount of this coat layer was 110 g per 1 L of the honeycomb substrate.

The honeycomb catalyst was subjected to the endurance test at 900° C. for 8 hours in the air, and the performance was then compared with each other. With regard to the three way characteristics of the honeycomb catalyst, the simulated exhaust gas composed of CO, $CO_2$, $C_3H_6$, $O_2$, NO, $H_2O$, and $N_2$ of the balance was scanned until A/F=14.1 to 14.8 (variation in concentration of CO and $O_2$), and allowed to flow through the ceramic honeycomb catalyst so as to have SV=10,000 $h^{-1}$, the outlet gas components at 400° C. were measured by using a CO/HC/NO analyzer (MOTOR EXHAUST GAS ANALYZER MEXA9100 manufactured by HORIBA, Ltd.), and the performance of the catalysts was compared with each other.

With regard to the light-off performance of the honeycomb catalyst, the temperature of the simulated exhaust gas composed of CO, $CO_2$, $C_3H_6$, $O_2$, NO, $H_2O$, and $N_2$ of the balance was raised at A/F=16 and 10° C./min, the simulated exhaust gas was allowed to flow through the ceramic honeycomb catalyst so as to have SV=10,000 $h^{-1}$, the outlet gas components at 400° C. were measured by using a CO/HC/NO analyzer (MOTOR EXHAUST GAS ANALYZER MEXA9100 manufactured by HORIBA, Ltd.), and the performance of the catalysts was compared with each other.

With regard to the light-off performance, the temperature (° C.) at which CO is purified by 50% (CO-T50) and the temperature (° C.) at which HC is purified by 50% (HC-T50) were as presented in Table 2.

TABLE 2

| | Catalyst component | | Purification performance | | | | |
|---|---|---|---|---|---|---|---|
| | | | Three way characteristics | | | | |
| | Mixed metal-oxide particles | Mn-based oxide particles | A/F | CO purification rate (%) | THC purification rate (%) | NOx purification rate (%) | Light-off |
| | | | | | | | CO-T50 (° C.) / HC-T50 (° C.) |
| Example 1 (catalyst composition A) | 10 parts by mass of CuO | 90 parts by mass of $YMn_2O_5$ | 14.1 | 66.6 | 10.4 | 97.1 | 278 / 328 |
| | | | 14.3 | 81.4 | 23.6 | 96.5 | |
| | | | 14.4 | 88.7 | 47.4 | 91.1 | |
| | | | 14.5 | 93.6 | 69.9 | 22.2 | |
| | | | 14.6 | 94.5 | 71.5 | 12.6 | |
| | | | 14.7 | 96.2 | 75.3 | 3.9 | |
| | | | 14.8 | 96.5 | 75.8 | 1.3 | |

TABLE 2-continued

| Catalyst component | | Purification performance | | | | | |
|---|---|---|---|---|---|---|---|
| | | Three way characteristics | | | | Light-off | |
| Mixed metal-oxide particles | Mn-based oxide particles | A/F | CO purification rate (%) | THC purification rate (%) | NOx purification rate (%) | CO-T50 (° C.) | HC-T50 (° C.) |
| Example 2 (catalyst composition C) | 5 parts by mass of CuO | 95 parts by mass of YMn$_2$O$_5$ | 14.1 | 68.8 | 9.8 | 96.6 | 279 | 351 |
| | | | 14.3 | 86.7 | 18.0 | 96.0 | | |
| | | | 14.4 | 95.0 | 35.8 | 88.9 | | |
| | | | 14.5 | 97.2 | 61.1 | 15.3 | | |
| | | | 14.6 | 97.6 | 63.9 | 6.2 | | |
| | | | 14.7 | 97.8 | 72.6 | 2.3 | | |
| | | | 14.8 | 97.9 | 80.5 | 0.3 | | |

Examples 3 to 5

The slurry-like catalyst compositions D to F were obtained in the same manner as in Example 1 except that the mass proportion of the YMn$_2$O$_5$ powder and the copper oxide particle powder were changed as presented in Table 3.

<Exhaust Gas Purification Performance Test 3>

A honeycomb substrate made of ϕ25.4 mm×L 30 mm-400 cell cordierite was immersed in the slurry-like catalyst compositions A and D to F obtained in Example 1 and Examples 3 to 5, and pulled up, the excess slurry was blown off therefrom, and the honeycomb substrate was dried and calcined for 1 hour at 500° C. to form a coating layer, thereby obtaining an exhaust gas purifying catalyst (sample). The amount of this coat layer was 110 g per 1 L of the honeycomb substrate.

The catalyst was set in an electric furnace kept at 850° C., the simulated exhaust gas was allowed to flow through the electric furnace while circulating a mixed gas (70 s) of C$_3$H$_6$ or CO and O$_2$ (complete combustion ratio) and the air (30 s), and treated for 25 hours, and the evaluation was conducted. With regard to the light-off performance of the honeycomb catalyst, the temperature of the simulated exhaust gas composed of CO, CO$_2$, C$_3$H$_6$, O$_2$, NO, H$_2$O, and N$_2$ of the balance was raised at A/F=16 and 10° C./min, the simulated exhaust gas was allowed to flow through the ceramic honeycomb catalyst so as to have SV=10,000 h$^{-1}$, the outlet gas components at 400° C. were measured by using a CO/HC/NO analyzer (MOTOR EXHAUST GAS ANALYZER MEXA9100 manufactured by HORIBA, Ltd.), and the performance of the catalysts was compared with one another.

The temperature (° C.) at which CO is purified by 50% (CO-T50), the temperature (° C.) at which HC is purified by 10% (HC-T10), and the temperature (° C.) at which NO is purified by 10% (NO-T10) were as presented in Table 1.

TABLE 3

| Catalyst component | | | | | Purification performance | | |
|---|---|---|---|---|---|---|---|
| Mixed metal-oxide particles | Content: in terms of Cu metal (parts by mass) | Method of addition | Mn-based oxide particles | Content: in terms of oxide (parts by mass) | CO-T50 (° C.) | HC-T10 (° C.) | NO-T10 (° C.) |
| Example 1 (catalyst composition A) | CuO | 10 | Physical mixing | YMn$_2$O$_5$ | 90 | 312 | 329 | 407 |
| Example 3 (catalyst composition D) | CuO | 15 | Physical mixing | YMn$_2$O$_5$ | 85 | 322 | 331 | 414 |
| Example 4 (catalyst composition E) | CuO | 30 | Physical mixing | YMn$_2$O$_5$ | 70 | 326 | 323 | 406 |
| Example 5 (catalyst composition F) | CuO | 40 | Physical mixing | YMn$_2$O$_5$ | 60 | 348 | 324 | 413 |

It has been possible to consider that the content of the copper-copper oxide particles (however, Cu amount in CuO in terms of copper metal excluding O in the case of CuO) is preferably from 1 to 60 parts by mass with respect to 100 parts by mass of the sum of the content of the copper-copper oxide particles and the content of the YMO particles, and it is even more preferably 4 parts by Mass or more or 35 parts by mass or less among them and it is even more preferably 5 parts by mass or more or 13 parts by mass or less among them in the present catalyst composition from the Examples 1 to 5 described above and the results of the tests which the inventors have conducted.

Examples 6 to q and 12

The slurry-like catalyst compositions G to J or O were obtained in the same manner as in Example 1 except that the oxide particle powder presented in Table 4 was mixed instead of the copper oxide particle powder.

<Exhaust Gas Purification Performance Test 4>

A honeycomb substrate made of φ25.4 mm×L 30 mm-400 cell cordierite was immersed in the slurry-like catalyst compositions G to J and O obtained Examples 6 to 9 and 12, in Comparative Examples 2 to 4, and pulled up, the excess slurry was blown off therefrom, and the honeycomb substrate was dried and calcined for 1 hour at 500° C. to form a coating layer, thereby obtaining an exhaust gas purifying catalyst (sample). The amount of this coat layer was 110 g per 1 L of the honeycomb substrate.

The honeycomb catalyst was subjected to the endurance test at 900° C. for 8 hours in the air, and the performance was then compared with one another. With regard to the three way characteristics of the honeycomb catalyst, the simulated exhaust gas composed of CO, $CO_2$, $C_3H_6$, $O_2$, NO, $H_2O$, and $N_2$ of the balance was scanned until A/F=14.1 to 14.8 (variation in concentration of CO and $O_2$), and allowed to flow through the ceramic honeycomb catalyst so as to have SV=10,000 $h^{-1}$, the outlet gas components at 400° C. were measured by using a CO/HC/NO analyzer (MOTOR EXHAUST GAS ANALYZER MEXA9100 manufactured by HORIBA, Ltd.), and the performance of the catalysts was compared with one another.

TABLE 4

| | Catalyst component | | | Purification performance Three way characteristics (400° C.) | | |
|---|---|---|---|---|---|---|
| | Mixed metal-oxide particles | Mn-based oxide particles | A/F | CO purification rate (%) | THC purification rate (%) | NOx purification rate (%) |
| Example 6 (catalyst composition G) | 10 parts by mass of NiO | 90 parts by mass of $YMn_2O_5$ | 14.1 | 38.1 | 2.3 | 11.1 |
| | | | 14.3 | 58.7 | 6.9 | 4.8 |
| | | | 14.4 | 81.3 | 17.7 | 2.5 |
| | | | 14.5 | 98.0 | 57.9 | 0.7 |
| | | | 14.6 | 98.3 | 64.9 | 0.4 |
| | | | 14.7 | 98.6 | 82.0 | 0.2 |
| | | | 14.8 | 98.7 | 90.7 | 0.0 |
| Example 7 (catalyst composition H) | 10 parts by mass of $Co_3O_4$ | 90 parts by mass of $YMn_2O_5$ | 14.1 | 36.5 | 0.3 | 1.0 |
| | | | 14.3 | 58.8 | 0.7 | 0.3 |
| | | | 14.4 | 84.9 | 2.5 | 0.0 |
| | | | 14.5 | 94.9 | 11.5 | 0.8 |
| | | | 14.6 | 94.6 | 11.1 | 1.0 |
| | | | 14.7 | 94.7 | 11.8 | 1.5 |
| | | | 14.8 | 94.7 | 12.6 | 1.8 |
| Example 8 (catalyst composition I) | 10 parts by mass of $Fe_2O_3$ | 90 parts by mass of $YMn_2O_5$ | 14.1 | 38.0 | 3.5 | 21.9 |
| | | | 14.3 | 58.3 | 8.3 | 9.4 |
| | | | 14.4 | 80.6 | 18.6 | 5.6 |
| | | | 14.5 | 97.8 | 56.6 | 1.2 |
| | | | 14.6 | 98.1 | 62.7 | 0.9 |
| | | | 14.7 | 98.4 | 78.2 | 1.2 |
| | | | 14.8 | 98.6 | 85.5 | 2.4 |
| Example 9 (catalyst composition J) | 10 parts by mass of $MnO_2$ | 90 parts by mass of $YMn_2O_5$ | 14.1 | 36.1 | 0.6 | 5.2 |
| | | | 14.3 | 57.6 | 2.6 | 2.9 |
| | | | 14.4 | 81.9 | 8.9 | 1.6 |
| | | | 14.5 | 95.7 | 37.7 | 2.1 |
| | | | 14.6 | 95.8 | 39.5 | 2.0 |
| | | | 14.7 | 95.9 | 44.1 | 2.4 |
| | | | 14.8 | 96.1 | 47.6 | 2.2 |
| Example 12 (catalyst composition O) | 10 parts by mass of $Ag_2O$ | 90 parts by mass of $YMn_2O_5$ | 14.1 | 38.2 | 3.4 | 25.8 |
| | | | 14.3 | 57.2 | 9.4 | 12.1 |
| | | | 14.4 | 77.3 | 19.3 | 5.8 |
| | | | 14.5 | 96.6 | 53.6 | 0.5 |
| | | | 14.6 | 97.2 | 58.8 | 0.0 |
| | | | 14.7 | 98.8 | 75.9 | 0.0 |
| | | | 14.8 | 99.1 | 90.9 | 0.0 |

From the results of Examples 6 to 9 and 12 described above, it has been possible to confirm that the catalyst composition exerts the three way catalytic activity even in a mixed state consisting of a combination of the YMO particles with the NiO particles, the YMO particles with the $Co_3O_4$ particles, the YMO particles with the $Fe_2O_3$ particles, the YMO particles with the $MnO_2$ particles, or the YMO particles with the $Ag_2O$ particles.

However, when it is compared to Example 1, it has been found that the catalyst composition exerts superior three way catalytic activity and exerts remarkably excellent purification performance particularly in the NOx purification performance in a mixed state consisting of a combination of the YMO particles with the CuO particles as compared to the mixed state consisting of a combination of the YMO particles with the NiO particles, the YMO particles with the $Co_3O_4$ particles, the YMO particles with the $Fe_2O_3$ particles, or the YMO particles with the $MnO_2$ particles.

It can be presumed that it is possible to obtain the same effect as that in at least Examples 1 to 9 and 12 when the particles containing a manganese-containing composite oxide and the particles containing a metal of Group 5 to Group 11 having an electron in the d orbital or an oxide of the metal are in a mixed state from Examples described above, the results of the tests which the inventors have conducted, and the technical reasons described above.

Examples 10 and 11

The slurry-like catalyst compositions K and L were obtained in the same manner as in Example 1 except that the manganese oxide particle powder presented in Table 5 was mixed instead of the $Mn_2O_5$ powder as the Mn-based oxide particles.

Comparative Examples 2 and 3

The slurry-like catalyst compositions M and N were obtained in the same manner as in Examples 10 and 11, respectively, except that the manganese oxide particle powder presented in Table 5 was crushed and mixed with water without mixing the copper oxide particles.

<Exhaust Gas Purification Performance Test 5>

A honeycomb substrate made of φ25.4 mm×L 30 mm-400 cell cordierite was immersed in the slurry-like catalyst compositions K to N obtained in Examples 10 and 11 and Comparative Examples 2 and 3, and pulled up, the excess slurry was blown off therefrom, and the honeycomb substrate was dried and calcined for 1 hour at 500° C. to form a coating layer, thereby obtaining an exhaust gas purifying catalyst (sample). The amount of this coat layer was 110 g per 1 L of the honeycomb substrate.

The honeycomb catalyst was subjected to the endurance test at 900° C. for 8 hours in the air, and the performance was then compared with one another. With regard to the three way characteristics of the honeycomb catalyst, the simulated exhaust gas composed of CO, $CO_2$, $C_3H_6$, $O_2$, NO, $H_2O$, and $N_2$ of the balance was scanned until A/F=14.1 to 14.8 (variation in concentration of CO and $O_2$), and allowed to flow through the ceramic honeycomb catalyst so as to have SV=10,000 $h^{-1}$, the outlet gas components at 400° C. were measured by using a CO/HC/NO analyzer (MOTOR EXHAUST GAS ANALYZER MEXA9100 manufactured by HORIBA, Ltd.), and the performance of the catalysts was compared with one another.

The three way characteristics were as presented in Table 5.

TABLE 5

| Catalyst component | | Purification performance Three way characteristics (400° C.) | | | |
|---|---|---|---|---|---|
| Mixed metal-oxide particles | Mn-based oxide particles | A/F | CO purification rate (%) | THC purification rate (%) | NOx purification rate (%) |
| Example 10 (catalyst composition K) 10 parts by mass of CuO | 90 parts by mass of LaMnO₃ | 14.1 | 58.5 | 2.1 | 98.9 |
| | | 14.3 | 85.3 | 17.1 | 97.4 |
| | | 14.4 | 93.4 | 39.0 | 82.9 |
| | | 14.5 | 97.3 | 66.6 | 17.2 |
| | | 14.6 | 97.6 | 72.5 | 10.7 |
| | | 14.7 | 98.8 | 84.3 | 2.3 |
| | | 14.8 | 99.2 | 78.9 | 0.4 |
| Example 11 (catalyst composition L) 10 parts by mass of CuO | 90 parts by mass YMnO₃ | 14.1 | 53.9 | 1.8 | 98.6 |
| | | 14.3 | 83.7 | 13.1 | 95.8 |
| | | 14.4 | 92.9 | 29.2 | 72.9 |
| | | 14.5 | 97.7 | 61.2 | 6.4 |
| | | 14.6 | 98.2 | 67.5 | 4.4 |
| | | 14.7 | 99.0 | 74.5 | 1.5 |
| | | 14.8 | 99.3 | 63.1 | 0.6 |
| Comparative Example 2 (catalyst composition M) | 100 parts by mass of LaMnO₃ | 14.1 | 34.1 | 2.2 | 0.0 |
| | | 14.3 | 51.4 | 4.9 | 0.0 |
| | | 14.4 | 63.9 | 11.0 | 0.0 |
| | | 14.5 | 63.2 | 13.8 | 0.0 |
| | | 14.6 | 62.4 | 14.2 | 0.0 |
| | | 14.7 | 62.2 | 15.0 | 0.0 |
| | | 14.8 | 62.3 | 16.0 | 0.0 |
| Comparative Example 3 (catalyst composition N) | 100 parts by mass of YMnO₃ | 14.1 | 35.3 | 1.4 | 2.1 |
| | | 14.3 | 55.9 | 5.1 | 0.6 |
| | | 14.4 | 70.1 | 8.8 | 0.0 |
| | | 14.5 | 75.3 | 14.9 | 0.0 |
| | | 14.6 | 75.3 | 15.3 | 0.0 |
| | | 14.7 | 76.3 | 16.9 | 0.0 |
| | | 14.8 | 77.2 | 18.5 | 0.0 |

From the results of Examples 10 and 11 described above, it has been found that the catalyst composition exerts three was; catalytic activity and exerts remarkably excellent purification performance particularly in the NOx purification performance even in a mixed state consisting of a combination of the LaMnO₃ particles with the CuO particles or the YMnO₃ particles with the CuO particles.

Hence, it has been found that the same effect as that in the case of mixing the YMO particles is obtained even in the manganese oxide particle powder other than the YMO particles.

It can be presumed that it is possible to obtain the same effect as that in at least Examples 1 to 11 when the particles containing a manganese-containing composite oxide and the particles containing a metal of Group 5 to Group 11 having an electron in the d orbital or an oxide of the metal are in a mixed state from the results of Examples 10 and 11 described above as well.

The invention claimed is:

1. A catalyst composition for purifying exhaust gas comprising particles containing a manganese-containing composite oxide (also referred to as the "Mn-based oxide particles") and particles containing a metal of Group 5 to Group 11 having an electron in the d orbital (however, Mn, Pt, Rh, and Pd are excluded) or an oxide of the metal (also referred to as the "mixed metal-oxide particles") in a mixed state, wherein the metal of Group 5 to Group 11 having the electron in the d orbital or the oxide of the metal accounts for 85% by mass or more of the mixed metal-oxide particles, and the Mn-based oxide particles consist of one or more kinds of manganese-containing composite oxides selected from the group consisting of yttrium manganite, praseodymium manganite, neodymium manganite, calcium manganate, strontium manganate, and barium manganite.

2. The catalyst composition for purifying exhaust gas according to claim 1, wherein an average particle size of the mixed metal-oxide particles is from 3 to 300% of an average particle size of the Mn-based oxide particles.

3. The catalyst composition for purifying exhaust gas according to claim 1, wherein an intensity of a main peak among the diffraction peaks attributed to the mixed metal-oxide is 5% or more of an intensity of a main peak among the diffraction peaks attributed to the Mn-based oxide in an XRD pattern determined by an XRD measurement (Cu/Kα).

4. The catalyst composition for purifying exhaust gas according to claim 1, wherein a content of the mixed metal-oxide particles (however, the amount in terms of metal excluding the amount of oxygen (O) in the case of an oxide) is from 1 to 60 parts by mass with respect to 100 parts by mass of a sum of a content of the mixed metal-oxide particles and a content of the Mn-based oxide particles.

5. The catalyst composition for purifying exhaust gas according to claim 1, wherein the catalyst composition for purifying exhaust gas does not support a precious metal.

6. The catalyst composition for purifying exhaust gas according to claim 1, wherein the mixed metal-oxide particles do not contain a platinum group.

7. An exhaust gas purifying catalyst comprising a configuration formed by supporting the catalyst composition for purifying exhaust gas according to claim 1 on a substrate.

8. The catalyst composition for purifying exhaust gas according to claim 1, wherein the mixed metal-oxide particles consist of the metal of Group 5 to Group 11 having the electron in the d orbital (however, Mn, Pt, Rh, and Pd are excluded) or the oxide of the metal.

9. A catalyst composition for purifying exhaust gas comprising particles containing a manganese-containing composite oxide (also referred to as the "Mn-based oxide particles") and particles containing a metal of Group 5 to Group 11 having an electron in the d orbital (however, Mn, Pt, Rh, and Pd are excluded) or an oxide of the metal (also referred to as the "mixed metal-oxide particles") in a mixed state, wherein the Mn-based oxide particles consist of one or more kinds of manganese-containing composite oxides selected from the group consisting of yttrium manganite, praseodymium manganite, neodymium manganite, calcium manganate, strontium manganate, and barium manganite.

* * * * *